United States Patent [19]

Yamada et al.

[11] Patent Number: 5,028,967
[45] Date of Patent: Jul. 2, 1991

[54] ACHROMATIC LENS FOR ULTRAVIOLET RAYS

[75] Inventors: Nobusuke Yamada, Machida; Koji Tsukuma, Atsugi; Tetsuo Fujii, Yamato; Hideaki Segawa; Shinichi Kondo, both of Yokohama; Keishi Honta, Zama, all of Japan

[73] Assignee: Tosoh Corporation, Shinnanyo, Japan

[21] Appl. No.: 494,393

[22] Filed: Mar. 16, 1990

[30] Foreign Application Priority Data

Mar. 16, 1989 [JP] Japan .................................. 1-62173
Mar. 23, 1989 [JP] Japan .................................. 1-69278

[51] Int. Cl.[5] .............................................. G02B 9/14
[52] U.S. Cl. ...................................... 350/1.2; 350/475; 372/101
[58] Field of Search .................. 350/1.1, 1.4, 1.7, 474, 475; 372/57, 101

[56] References Cited

U.S. PATENT DOCUMENTS

| 3,517,979 | 6/1970 | Lowenthal | 350/1.2 |
| 4,050,778 | 9/1977 | Fleischman | 350/1.2 |
| 4,461,546 | 7/1984 | Muffoletto et al. | 350/1.3 |
| 4,494,819 | 1/1985 | Lidwell | 350/1.1 |
| 4,871,219 | 10/1989 | Cooper | 350/1.4 |

FOREIGN PATENT DOCUMENTS 0458798  1/1975  U.S.S.R. ............................... 350/1.2

Primary Examiner—Rodney B. Bovernick
Attorney, Agent, or Firm—Oblon, Spivak, McClelland, Maier & Neustadt

[57] ABSTRACT

An achromatic lens for ultraviolet rays constituted by (A) high-purity silica glass having a purity of 99.9% or more, or fluorine-containing, high-purity silica glass having a purity of 99.9% or more; and (B) silica glass containing germanium dioxide or silica glass containing germanium dioxide and boron oxide.

12 Claims, 1 Drawing Sheet 5,028,967

ACHROMATIC LENS FOR ULTRAVIOLET RAYS

BACKGROUND OF THE INVENTION

The present invention relates to an optical achromatic lens, and more particularly to an optical achromatic lens which can be used for reduction projection aligners (steppers) in ultraviolet lithography, etc., for instance, excimer laser reduction projection aligners (steppers) of XeCl, KrF, etc.

Heretofore, steppers having ultrahigh-voltage mercury lamps as light sources have been used for photolithography in the production of semiconductors. However, since LSIs have become highly integrated recently, g-line (436 nm) and i-line (365 nm) of the ultrahigh-voltage mercury lamp used in conventional steppers have become insufficient in resolution.

To increase resolution, development has been made to provide steppers using as light source excimer lasers having shorter wavelengths such as those of XeCl, KrF, etc. However, to achieve the resolution desired in these steppers, chromatic aberration should be removed. Presently, to remove the chromatic aberration in excimer lasers, two methods were proposed.

One method is to narrow the half width of laser beams to reduce the chromatic aberration to the permitted range, and another method is to use an achromatic lens in an optical system to correct the chromatic aberration.

In the case of the first method in which the chromatic aberration is suppressed to the permitted range by narrowing the half width of laser beams, elements such as etalons and prisms and methods such as injection locking, etc. are used to reduce the half width of laser beams to 0.003–0.005 nm. However, the reduction of the half width of laser beams poses several problems. For instance, to compensate the decrease in laser output due to element losses, the power of the laser should be increased, and for this purpose, the laser beam-generating apparatus itself should be scaled up. In addition, speckle patterns become likely to appear, and it is difficult to provide a large projection area.

On the other hand, in the case of the second method in which the achromatic lens is used in an optical system to correct the chromatic aberration, there are only limited materials capable of transmitting excimer laser efficiently. The achromatic lens is constituted by two types of optical materials having different dispersion, and there has conventionally been proposed a combination of high-purity silica glass and a calcium fluoride single crystal (fluorite). There has also been proposed an achromatic lens constituted by a combination of a lens made of synthetic silica glass containing oxides of transition elements such as titanium, iron, etc., oxides of rare earth elements such as lanthanum, cerium, europium, etc., and a lens made of synthetic silica glass containing no additives, which utilizes the difference in dispersion power between them to remove the chromatic aberration (Japanese Patent Laid-Open No. 63-6512).

However, when fluorite is used as an optical material for lens, it has various problems as compared with glass. First, since the fluorite has low hardness, it is vulnerable to scratches. Also, since it is a single crystal, it has cleavage which makes it difficult to have a smooth lens surface. As a result, it is not easy to conduct optical lapping on the fluorite. In addition, since the fluorite is slightly soluble in water, it is poor in durability. Further, it has poor mechanical strength. Because of these problems, the fluorite cannot easily be formed into large lenses having diameters of 100 mm or more.

For these reasons, excimer laser steppers having optical systems constituted by achromatic lenses have presently not achieved the stage of practical use.

On the other hand, in the case of the lens made of synthetic silica glass containing oxides of transition elements and rare earth elements, these additives cause ultraviolet absorption, resulting in the reduction of transmittance and the generation of fluorescence. Accordingly, these additives are not suitable for achromatic lenses for ultraviolet rays, and rather should be removed.

OBJECTS AND SUMMARY OF THE INVENTION

Accordingly, an object of the present invention is to provide an achromatic lens for ultraviolet rays free from the above problems.

As a result of intense research in view of the above object, the inventors have found that by adjusting the amounts of germanium dioxide and boron oxide added, it is possible to change the refractive index and dispersion of silica glass freely, that such silica glass is free from problems from which the fluorite and silica glass containing transition element oxides, etc. are suffering, and that large and high-precision achromatic lenses can be produced by combining the germanium-containing silica glass or the germanium and boron-containing silica glass with high-purity silica glass. The present invention is based on these findings.

Thus, the achromatic lens for ultraviolet rays according to the first embodiment of the present invention is constituted by (A) high-purity silica glass having a purity of 99.9% or more, or fluorine-containing, high-purity silica glass having a purity of 99.9% or more; and (B) silica glass containing germanium dioxide.

The achromatic lens for ultraviolet rays according to the second embodiment of the present invention is constituted by (A) high-purity silica glass having a purity of 99.9% or more, or fluorine-containing, high-purity silica glass having a purity of 99.9% or more; and (B) silica glass containing germanium dioxide and boron oxide.

Any of the above achromatic lenses for ultraviolet rays can transmit ultraviolet rays having a wavelength of 300 nm or less, so that it can be used in optical systems of excimer laser reduction projection aligners (steppers).

DETAILED DESCRIPTION OF THE INVENTION

Figure 1:
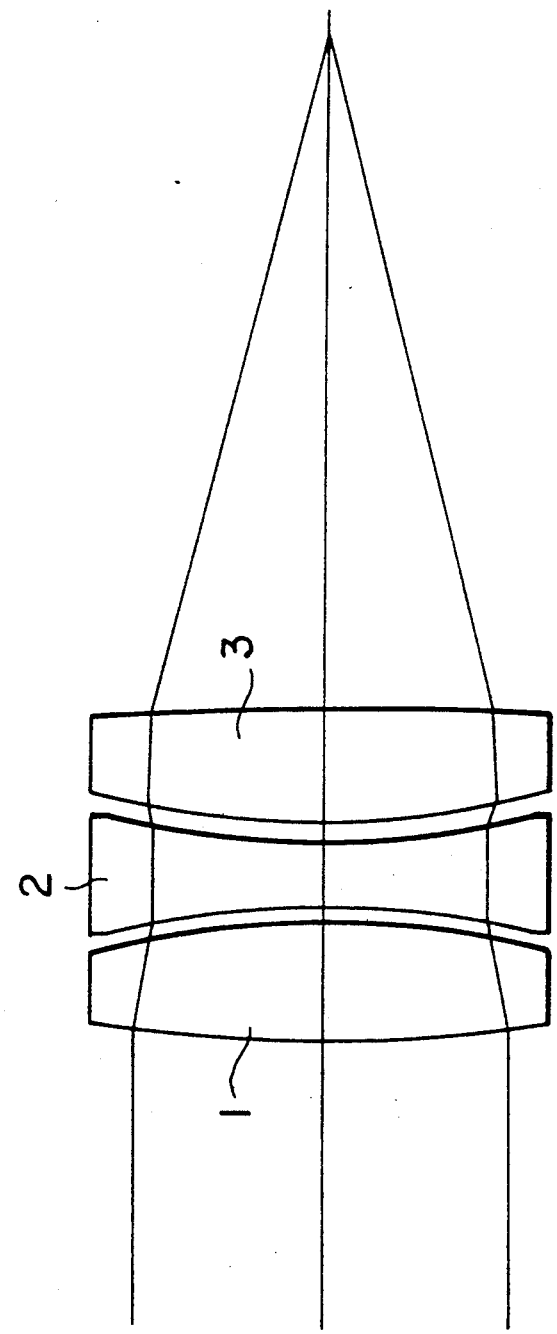
FIG. 1 is a cross-sectional view showing an example of the constitution of the achromatic lens according to the present invention.

In general, to constitute an achromatic lens, lenses made of two types of optical materials having different dispersion are assembled.

The inventors have found that as glass to be combined with high-purity silica glass or fluorine-containing, high-purity silica glass, silica glass containing germanium dioxide alone or germanium dioxide+boron oxide is suitable.

In the first embodiment of the present invention, the achromatic lens for ultraviolet rays is constituted by a lens made of germanium-containing silica glass and a lens made of high-purity silica glass or fluorine-containing, high-purity silica glass.

In the second embodiment of the present invention, the achromatic lens for ultraviolet rays is constituted by a lens made of silica glass containing germanium dioxide and boron oxide and a lens made of high-purity silica glass or fluorine-containing, high-purity silica glass.

First, the high-purity silica glass or fluorine-containing, high-purity silica glass used in both of the first and second embodiments will be described below.

To achieve the object of the present invention, the high-purity silica glass should have a purity of 99.9% or more, and the fluorine-containing, high-purity silica glass should have a purity of 99.9% or more for $SiO_2+F$. Particularly to avoid the ultraviolet absorption, impurities such as transition elements and rare earth elements should be reduced to several hundreds of ppm or less, preferably several tens of ppm or less, and more preferably several ppm or less. For instance, in the case of titanium as an impurity, its concentration should be 1 ppm or less.

When the fluorine-containing, high-purity silica glass is used, a large fluorine content is preferable from the aspect of refractive index, but the fluorine content should be on the level that does not adversely affect the transmittance of silica glass. Specifically, the fluorine content is preferably 2–4 mol %.

Silica powder usable as a raw material for high-purity silica glass and F-containing high-purity silica glass is not restricted to a particular one, and any silica powder, for instance, silica powder produced from silica gel obtained by a wet method, silica powder produced by a vapor phase method, etc. can be used. The silica powder may be amorphous or crystalline. Its average particle size is not restricted to a particular range, but from the viewpoint of reactivity and easiness of handling, it is preferably 0.01–500 μm, and more preferably 0.5–250 μm, particularly 1–50 μm. Incidentally, when anhydrous silica glass containing 1 ppm or less of OH groups is to be produced, the silica powder is desirably very fine, particularly as fine as 1–10 μm. With respect to the purity of raw material powder, it is 99.9% or more, and preferably 99.95% or more.

A high-purity silica glass block may be produced by a vapor-phase Bernoulli method in which $SiCl_4$ is flame-hydrolyzed by oxyhydrogen flame and accumulated, a hot pressing method, a hot isostatic pressing method, etc.

The hot pressing (HP) conditions are exemplified as follows: A silica glass powder molding is embedded in filler powder such as crystalline silica powder, and compressed at a temperature of 1100° C. or more, preferably 1200°–1650° C., and at a pressure of 5 MPa or more, preferably 10–100 MPa. Incidentally, a hot pressing atmosphere may be vacuum of 1 Pa or less or an inert gas such as Ar, He, etc.

The hot isostatic pressing (HIP) conditions are exemplified as follows: Silica powder is sealed in a silica glass capsule, and the capsule is embedded in filler powder unreactive to the capsule, such as graphite powder, boron nitride powder, etc. and placed in a HIP apparatus. The HIP temperature is 1100° C. or more, preferably 1200°–2000° C., and the pressure is 5 MPa or more, preferably 10–200 MPa. The pressure medium gas is an inert gas such as Ar.

In addition to conducting HP and HIP alone, they may be used in combination. In the case of HP/HIP treatment, the hot pressing is conducted at 1100° C. or more, preferably at 1200°–2000° C. and at 5 MPa or more, preferably at 10–100 MPa, and then the resulting silica glass block is placed in a HIP apparatus and subjected to a HIP treatment at 1200° C. or more, preferably at 1400°–2000° C. and at 1 MPa or more, preferably at 10–200 MPa.

The fluorine-containing, high-purity silica glass may be produced, for instance, by the following method: First, silicon alkoxides or $SiCl_4$ is hydrolyzed to prepare high-purity silica glass powder, which is then wet-molded. The resulting silica glass molding is placed, for instance, in a silica glass flange and heated to 800° C. in an oxygen atmosphere to burn organic materials. Thereafter, an OH group-removing treatment is conducted in a mixed gas containing He and 5–30% $Cl_2$. It is then sintered at 1500° C. in an $SiF_4$ gas or in a mixed gas of $SiF_4$ and He to introduce F into the silica glass. The F concentration in the silica glass can be adjusted by controlling the partial pressure of $SiF_4$.

The silica glass containing germanium dioxide used in the first embodiment will be described.

In general, when germanium dioxide is added to silica glass, its refractive index and dispersion are increased. For instance, when 13.5 mol % of germanium dioxide is added to the silica glass, the refractive index of the silica glass to a light beam (wavelength: 248 nm) becomes 1.5406, 2.1% higher than that containing no germanium dioxide.

Here, there is an important parameter for an achromatic lens for ultraviolet rays, which is called "Abbe number." The Abbe number is generally defined as $(n_d-1)/(n_F-n_C)$, wherein $n_d$ is a refractive index to d-line (587.6 nm) of helium, and $n_F$ and $n_C$ respectively are refractive indices to F-line (486.1 nm) and C-line (656.3 nm) of hydrogen. However, it is defined herein as a number obtained by dividing (refractive index at 248.2 nm minus 1) by dispersion at 248.2 nm.

In the case of silica glass containing 13.5 mol % of germanium dioxide, an Abbe number ratio of silica glass containing no additives to germanium dioxide-containing silica glass $[v(SiO_2)/v(Ge-SiO_2)]$ is 1.12, and the Abbe number ratio of 3.9-mol % fluorine-containing, high-purity silica glass to germanium dioxide-containing silica glass $[v(F-SiO_2)/v(Ge-SiO_2)]$ is 1.13.

To constitute the achromatic lens, a convex lens made of glass having a large Abbe number, and a concave lens made of glass having a small Abbe number are combined. Accordingly, the achromatic lens is constituted by a convex lens made of high-purity silica glass containing no additives or fluorine-containing, high-purity silica glass and a concave lens made of germanium-containing silica glass.

In general, the larger the Abbe number ratio, the more the chromatic aberration can be removed in a wide wavelength range. Accordingly, the germanium dioxide is contained preferably as much as possible. However, when an excess amount of germanium dioxide is added, there arises the problem that the silica glass becomes opaque and that the transmittance of ultraviolet rays decreases. Therefore, the content of germanium dioxide is preferably 50 mol % or less. The more preferred germanium dioxide content is 5–14 mol %. Within this range, germanium dioxide does not cause ultraviolet absorption, so that the transmittance of ultraviolet rays does not substantially decrease.

Next, the silica glass containing germanium dioxide and boron oxide used in the second embodiment will be described.

When germanium dioxide is added to the silica glass, its refractive index and dispersion become high, and when boron oxide is added to the silica glass, its refractive index is lowered and the dispersion becomes high. For instance, when 5 mol % of germanium dioxide and 10 mol % of boron oxide are added to the silica glass, its refractive index to a light having a wavelength of 248 nm increases 0.4% than that containing no additives, and a dispersion ratio of the germanium dioxide and boron oxide-containing silica glass to the silica glass containing no additives ($\Delta$Ge-B-SiO$_2$/$\Delta$SiO$_2$) is 1.12. Also, the Abbe number ratio [v(SiO$_2$)/v(Ge-B-SiO$_2$)] is 1.11. Accordingly, an achromatic lens can be constituted by a convex lens made of silica glass containing no additives or fluorine-containing, high-purity silica glass and a concave lens made of silica glass containing germanium dioxide and boron oxide.

As described above, the larger an absolute value of the Abbe number ratio, the more chromatic aberration-removing effects can be obtained. Accordingly, the content of germanium dioxide is preferably as much as possible. However, the addition of an excess amount of germanium dioxide makes it difficult to obtain sufficient transmittance of excimer laser beams in a far-ultraviolet wavelength range. Therefore, the content of germanium dioxide is preferably 1–30 mol %, and more preferably 10–15 mol %. The addition of a proper amount of boron oxide together with germanium dioxide leads to more uniform silica glass. The addition of boron oxide does not decrease the transmittance in a far-ultraviolet range. The content of boron oxide is preferably 5–30 mol %, and more preferably 7–14 mol %.

Next, the method of producing the silica glass containing germanium dioxide with or without boron oxide will be described.

Alkoxides of silicon and germanium such as silicon tetraethoxide, germanium tetraethoxide, etc. as starting materials are used, and hydrolysis is conducted to provide silica glass powder containing germanium, which is subjected to die-pressing or cold isostatic pressing and then sintered to completely or partially glassify the silica glass powder. To produce silica glass capable of efficiently transmitting ultraviolet rays having wavelengths of 300 nm or less, the sintering atmosphere should be an oxidizing atmosphere, and preferably it is an atmosphere of helium and oxygen in a ratio of 1:1. The sintered silica glass is then subjected to hot isostatic pressing in an oxygen atmosphere to provide silica glass free from voids. The sintering temperature is preferably 1200°–1400° C., and the temperature and pressure in the high-temperature, high-pressure are preferably 1300° C. or higher, and 50 MPa or higher. By this method, a large glass block can be obtained without suffering from cords and strains, which are serious problems for optical glass. In addition, the resulting silica glass has excellent optical homogeneity.

In the case of the silica glass containing germanium dioxide and boron oxide, it can be produced by the following method: Alkoxides of silicon and boron as described above or chlorides such as silicon tetrachloride, boron trichloride, germanium chloride, etc. are used as starting materials, and hydrolysis is conducted to provide silica glass powder containing germanium dioxide and boron oxide. This powder is subjected to die-pressing, cold isostatic pressing, etc. and then sintered in an atmosphere of helium or a mixed gas of helium and oxygen, thereby completely or partially glassifying the silica glass powder. The resulting glass is then subjected to hot pressing or hot isostatic pressing. The sintering temperature is preferably 1200°–1700° C., and the temperature and pressure in the high-temperature, high-pressure treatment are 1300° C. or higher and 10 MPa or higher in hot pressing, and 1300° C. or higher and 50 MPa or higher in hot isostatic pressing. By this method, too, a large glass block can be produced without suffering from cords and strains. In addition, the resulting silica glass has excellent optical homogeneity.

Another feature of the present invention is the use of the achromatic lens for ultraviolet rays comprising germanium-containing silica glass or germanium and boron-containing silica glass in an optical system for a reduction projection aligners of an excimer laser stepper. For instance, laser beams generated by a KrF excimer laser usually have a half width of 0.7 nm. In steppers presently available, when reduction projection is conducted by using an optical lens constituted by only silica glass, the deviation of focal length due to chromatic aberration reaches several tens $\mu$m, failing to provide clear image. It may be conceivable to suppress the chromatic aberration by narrowing the half width of the laser beam, but this suffers from the above-mentioned problems.

Such problems can essentially be solved by using the achromatic lens of the present invention. That is, since the chromatic aberration can be corrected by an optical lens, it is not necessary to extremely narrow the half width of laser beams. In addition, the optical lens made of the silica glass of the present invention can be much more easily worked than the fluorite. Specifically speaking, since the silica glass of the present invention has much higher hardness than the fluorite, it is not vulnerable to scratches during grinding and lapping, making it possible to conduct the grinding and lapping of the silica glass lens by using usual grinding and lapping abrasives for optical lens. In addition, the grinding and lapping of the achromatic lens according to the present invention can be conducted at high dimension accuracy.

FIG. 1 shows an example of the achromatic lens constituted by three simple lenses. As described above, convex lenses 1, 3 made of glass having a large Abbe number and a concave lens 2 made of glass having a small Abbe number are combined. Accordingly, the convex lenses 1, 3 are formed by high-purity silica glass containing no additives or fluorine-containing, high-purity silica glass, and the concave lens 2 is formed by germanium-containing silica glass or germanium and boron-containing silica glass. Both lenses are combined to constitute the achromatic lens. Incidentally, each lens is not limited with respect to shape, combination and number.

The present invention will be described in further detail by the following Examples without any intention of restricting the scope of the present invention.

REFERENCE EXAMPLES 1–6

High-purity silica glass was obtained by cutting out a proper portion from an ingot prepared by a Bernoulli method, and fluorine-containing, high-purity silica glass was produced by sintering molded silica glass powder in an atmosphere of a silicon tetrafluoride gas at 1500° C.

Germanium-containing silica glass was produced by using as alkoxides of silicon and germanium tetraethoxysilane and germanium tetraethoxide, respectively, and subjecting mixed powder obtained by hydrolzing the above compounds to sintering at 1500° C. in a helium atmosphere, and further to annealing at 1000° C. for 24 hours.

Germanium and boron-containing silica glass was produced by using as alkoxides of silicon, germanium and boron tetraethoxysilane, germanium tetraethoxide and trimethoxyboron, respectively, and subjecting mixed powder obtained by hydrolyzing the above compounds to sintering at 1500° C. in a helium atmosphere, and further to annealing at 1000° C. for 24 hours.

Glass blocks obtained by the above methods are as follows:
High-purity silica glass (purity: 99.99% or more);
Fluorine-containing, high-purity silica glass (fluorine content: 3.9 mol %);
Germanium-containing silica glass (germanium dioxide content: 3.9 mol %, 4.1 mol %, 13.5 mol %); and
Germanium and boron-containing silica glass (germanium dioxide content: 4.7 mol %, boron oxide content: 9.7 mol %).

Each of the above silica glass blocks had a diameter of 130 mm and a thickness of 30 mm.

Each of the above silica glass blocks was measured with respect to optical homogeneity by using a laser interferometer. Further, a prism was produced from each silica glass block to measure its refractive index in an ultraviolet range by an high-precision spectrophotometer. The results are shown in Table 1.

Optical homogeneity $\Delta n$ was less than $3.0 \times 10^{-6}$ in any of the high-purity silica glass, the fluorine-containing, high-purity silica glass, the germanium-containing silica glass, and the germanium and boron-containing silica glass, meaning that they had satisfactory optical properties as optical materials for optical lenses. In addition, the germanium-containing silica glass showed a refractive index and dispersion both increasing as the germanium content increases.

EXAMPLES 1-7, COMPARATIVE EXAMPLE 1

Each convex lens 1, 3 shown in FIG. 1 was produced by using high-purity silica glass (purity: 99.99% or more) and fluorine-containing, high-purity silica glass (fluorine content: 3.9 mol %) prepared in the same manner as in Reference Examples 1 and 2. And a concave lens 2 was produced by using each of germanium dioxide-containing silica glass (germanium dioxide content: 4.1 mol %, 7.0 mol %, 13,5 mol %) and germanium dioxide and boron oxide-containing silica glass (germanium dioxide content: 4.7 mol %, boron oxide content: 9.7 mol %) prepared in the same manner as in Reference Examples 3-6. Next, the two convex lenses 1,3 and the concave lens 2 were combined to provide a triplet lens constituted as shown in FIG. 1. Each lens was produced by grinding to predetermined dimension and size by using a rough grinding dish and grinding sand, and then finely lapping with cerium oxide. Thereafter, each lens was subjected to centering to determine its optical axis. It was confirmed by examination that dimensions of each lens were within tolerances.

The above operation is the same as in the production procedure of usual lenses, without necessitating complicated steps unlike the fluorite. In addition, the resulting lens was free from scratches which are sometimes observed in fluorite lenses.

By using the achromatic lens constituted by the convex lenses and the concave lens, measurement was conducted on longitudinal chromatic aberration generated when KrF excimer laser beams having different half widths were gathered by a condenser. The results are shown in Table 2. Table 2 also shows as Comparative Example the chromatic aberration of a monochromatic lens (triplet lens) constituted by three lenses all made of silica glass containing no additives.

TABLE 1

| Reference Example No. | Type | Additive Content (mol %) | Optical Homogeneity $\Delta n \times 10^{-6}$ | Refractive Index at 248.2 nm | Dispersion ($\mu m^{-1}$) | Abbe Number ($\mu m$) |
|---|---|---|---|---|---|---|
| 1 | High-Purity Silica Glass | — | 2.0 | 1.508551 | 0.5608 | −0.9069 |
| 2 | F-Containing Silica Glass | 3.9 | 2.8 | 1.491160 | 0.5356 | −0.9170 |
| 3 | Ge-Containing Silica Glass | 3.9 | 2.7 | 1.518098 | 0.5917 | −0.8757 |
| 4 | Ge-Containing Silica Glass | 4.1 | 2.8 | 1.526367 | 0.6367 | −0.8267 |
| 5 | Ge-Containing Silica Glass | 13.5 | 2.9 | 1.540501 | 0.6659 | −0.8117 |
| 6 | Ge, B-Containing Silica Glass | $GeO_2$: 4.7 $BO_{1.5}$: 9.7 | 2.8 | 1.512670 | 0.6258 | −0.8253 |

TABLE 2

| No. | Lens 2 | Lens 1, 3 | Abbe number ratio $vSiO_2/vGe\text{—}SiO_2$ | Chromatic Abberation [nm] at Each Laser Width | | | |
|---|---|---|---|---|---|---|---|
| | | | | 0.003 | 0.005 | 0.007 | 0.010 |
| Example 1 | 4.1 mol % Ge-Containing Silica Glass | High-Purity Silica Glass | 1.036 | 0.302 | 0.498 | 0.654 | 0.996 |
| Example 2 | 7.0 mol % Ge-Containing Silica Glass | High-Purity Silica Glass | 1.097 | 0.232 | 0.391 | 0.493 | 0.671 |
| Example 3 | 13.5 mol % Ge-Containing Silica Glass | High-Purity Silica Glass | 1.117 | 0.209 | 0.360 | 0.448 | 0.583 |
| Example 4 | 4.1 mol % Ge-Containing | 3.9 mol % F-Containing | 1.047 | 0.289 | 0.477 | 0.623 | 0.931 |

TABLE 2-continued

| No. | Lens 2 | Lens 1, 3 | Abbe number ratio vSiO$_2$/vGe—SiO$_2$ | Chromatic Abberation [nm] at Each Laser Width | | | |
|---|---|---|---|---|---|---|---|
| | | | | 0.003 | 0.005 | 0.007 | 0.010 |
| Example 5 | Silica Glass 7.0 mol % Ge-Containing Silica Glass | Silica Glass 3.9 mol % F-Containing Silica Glass | 1.109 | 0.218 | 0.372 | 0.465 | 0.617 |
| Example 6 | 13.5 mol % Ge-Containing Silica Glass | 3.9 mol % F-Containing Silica Glass | 1.130 | 0.194 | 0.341 | 0.420 | 0.531 |
| Example 7 | Ge, B-Containing Silica Glass[1] | High-Purity Silica Glass | 1.111[2] | 0.1 | 0.2 | 0.4 | 0.6 |
| Comparative Example 1 | High-Purity Silica Glass | High-Purity Silica Glass | 1.000 | 0.4 | 0.6 | 0.8 | 1.2 |

Note:
[1] GeO$_2$: 4.7 mol %. BO$_{1.5}$: 9.7 mol %.
[2] ΔSiO$_2$/ΔGe, B—SiO$_2$.

As is clear from Table 2, the achromatic lens using a germanium-containing silica glass or germanium and boron-containing silica glass shows smaller chromatic aberration than the monochromatic lens, meaning that the achromatic lens of the present invention has excellent chromatic aberration correcting effects.

As is clear from the above description, the achromatic lens for ultraviolet rays according to the present invention has high optical homogeneity, excellent chromatic aberration correction effects and excellent durability. In addition, as compared with fluorite, the germanium-containing silica glass and the germanium and boron-containing silica glass used in the present invention are easy in high-precision finishing, and large lenses can be produced therefrom. Therefore, the achromatic lens for ultraviolet rays of the present invention can be used widely for optical apparatuses utilizing ultraviolet rays, such as optical systems of excimer laser steppers.

What is claimed is:

1. An achromatic lens system for ultraviolet rays constituted by:
   (a) at least one first lens made of high-purity silica glass having a purity of 99.9% or more, or fluorine-containing, high-purity silica glass having a purity of 99.9% or more; and
   (b) at least one second lens made of silica glass containing germanium dioxide.

2. The achromatic lens system for ultraviolet rays according to claim 1, wherein said silica glass of said second lens (b) contains 50 mol % or less of germanium dioxide.

3. The achromatic lens system for ultraviolet rays according to claim 1, wherein said silica glass of said second lens (b) contains 5-14 mol % of germanium dioxide.

4. The achromatic lens system according to claim 1, wherein said first lens is a convex lens, and said second lens is a concave lens.

5. An achromatic lens system for ultraviolet rays constituted by:
   (a) at least one first lens made of high-purity silica glass having a purity of 99.9% or more, or fluorine-containing, high-purity silica glass having a purity of 99.9% or more; and
   (b) at least one second lens made of silica glass containing germanium dioxide and boron oxide.

6. The achromatic lens system for ultraviolet rays according to claim 5, wherein said silica glass of said second lens (b) contains 1-30 mol % of germanium dioxide and 5-30 mol % of boron oxide.

7. The achromatic lens system for ultraviolet rays according to claim 5, wherein said silica glass of said second lens (b) contains 10-15 mol % of germanium dioxide and 7-14 mol % of boron oxide.

8. The achromatic lens system according to claim 5, wherein said first lens is a convex lens, and said second lens is a concave lens.

9. An excimer laser reduction projection aligner having in its optical system an achromatic lens system for ultraviolet rays showing high transmittance of ultraviolet rays having a wavelength of 300 nm or less, said achromatic lens system being constituted by (a) at least one first lens made of high-purity silica glass having a purity of 99.9% or more, or fluorine-containing, high-purity silica glass having a purity of 99.9% or more; and (b) at least one second lens made of silica glass containing germanium dioxide.

10. The excimer laser reduction projection aligner according to claim 9, wherein said first lens is a convex lens, and said second lens is a concave lens.

11. An excimer laser reduction projection aligner having in its optical system an achromatic lens system for ultraviolet rays showing high transmittance of ultraviolet rays having a wavelength of 300 nm or less, said achromatic lens system being constituted by (a) at least one first lens made of high-purity silica glass having a purity of 99.9% or more, fluorine-containing, high-purity silica glass having a purity of 99.9% or more; and (b) at least one second lens made of silica glass containing germanium dioxide and boron oxide.

12. The excimer laser reduction projection aligner according to claim 11, wherein said first lens is a convex lens, and said second lens is a concave lens.

* * * * *